Patented Dec. 6, 1938

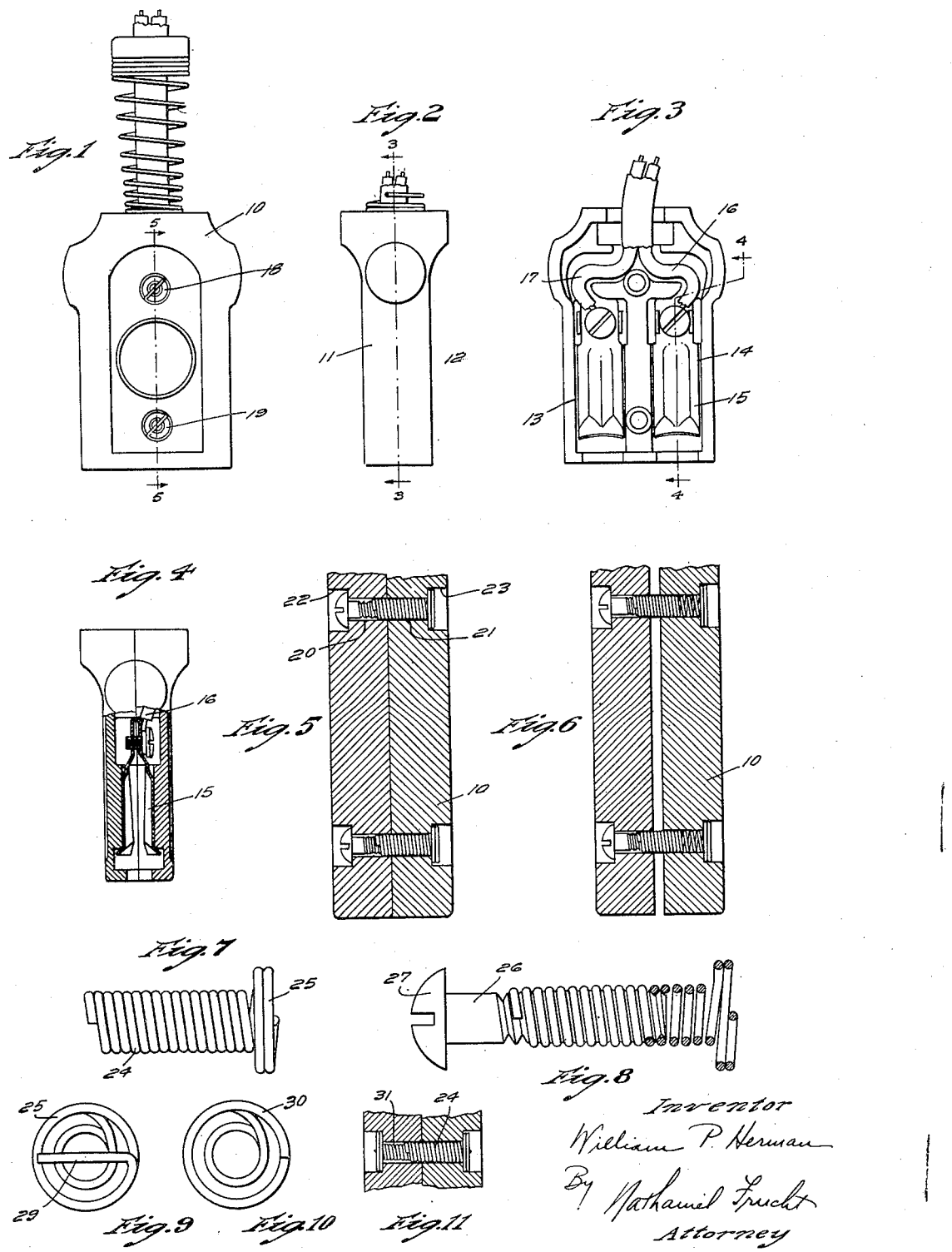

2,138,919

UNITED STATES PATENT OFFICE 2,138,919

PLUG SOCKET CONSTRUCTION

William P. Herman, Providence, R. I.

Application December 26, 1935, Serial No. 56,180

3 Claims. (Cl. 173—332)

My present invention relates to electric appliances, and has particular reference to a novel construction for a connecting plug.

Connecting plug sockets of standard type include two portions which have been detachably secured to each other by means of bolts and screws, and house spring clamp members having wire connections and adapted to detachably receive the prongs of an electric appliance plug. This type of construction has had a disadvantageous feature in that the retention of the prong in the clamps has depended on the resilience of the clamp elements whereby the clamp parts have had a tendency to spread and thus decrease the effective life of the plug socket.

I have therefore devised a construction which utilizes resilient means yieldingly holding the two portions of the socket together, whereby the resilience of the clamp members is aided by the resilient closing tendency of the two socket portions, and I have so formed the connection that the parts are rigidly held together and cannot become loose, and if desired, cannot be separated by the user. It is the principal object of my invention to provide a plug socket construction which has novel means for yieldingly urging the two socket parts towards each other.

It is an additional object of my invention to provide a spring holding arrangement which cannot become loose during shipment or handling.

It is a further object of my invention to provide a holding connection which constitutes a substantially permanent lock, and ensures against accidental displacement and separation of the two plug socket parts.

With the above and other objects and advantageous features in view, the invention consists of a novel arrangement of parts more fully disclosed in the detailed description following and more specifically defined in the claims appended thereto.

In the drawing:

Fig. 1 is a front elevation of a plug socket embodying the novel invention;

Fig. 2 is a side elevation thereof;

Fig. 3 is a section on the line 3—3 of Fig. 2;

Fig. 4 is a section on the line 4—4 of Fig. 3;

Fig. 5 is an enlarged detailed section on the line 5—5 of Fig. 1;

Fig. 6 is a view similar to Fig. 5, but showing the parts separated against the tension of the holding means when a plug is inserted in the socket;

Fig. 7 is an enlarged view of the novel spring retainer;

Fig. 8 is an enlarged view showing the displacement of the spring retainer coils when the holding bolt is threaded therein;

Fig. 9 is an end view of Fig. 7;

Fig. 10 is an end view showing a modified end construction; and

Fig. 11 is a view similar to Fig. 8 but showing the use of a spring coil instead of a holding bolt.

Referring to the drawing, the socket 10 includes two separable halves 11 and 12, each half being recessed as at 13, 14, so as to house a pair of resilient clamps 15 therein which are electrically connected in the usual manner to two wires 16, 17. When the two halves 11 and 12 are locked together, the two clamps are in proper position for resiliently receiving the two prongs of a connecting plug of standard type.

The two halves 11, 12 are locked together by means of two novel holding arrangements 18, 19 which extend through suitable openings 20, 21 in the two halves; these openings have end recesses 22, 23 for receiving the heads of the connecting devices. These connecting devices, see Figs. 7, 8, and 9, each include a spring coil 24 having its end formed to provide a head 25, and a bolt 26 having a head 27, the threads 28 of the bolt being adapted to enter into the coil 24. The threads are slightly greater than the internal diameter of the coil, whereby the coil sections are spread when the screws are threaded therein, as indicated in Fig. 8, to provide a resilient lock which cannot be displaced or separated by handling during shipment or during use. When the contact prongs are inserted into the clamp members, the two retainers yield as shown in Fig. 6, thus helping the resilience of the clamp members, and ensuring a longer and more effective life for the connecting socket.

Preferably, the head 25 of the retainer coil is formed with a cross-bar 29, see Fig. 9, whereby the screw 26 may be screwed out of the retainer coil by gripping the cross-bar 29 with a pair of tweezers. If, however, it is desired to prevent removal of the screw by the user, the head may be formed as indicated in Fig. 10, whereby the head snugly fits the recess 23 to prevent removal; the recess may, if desired, be formed with an exterior lip so as to effectively conceal the coil forming the head 30.

Instead of using a screw 26, a second coil 31, see Fig. 11, may be used, the width of this coil being slightly smaller than the retainer coil 11 whereby the coil 31 may be threadedly inserted into the coil 24, thus substantially doubling the resilient means urging the two socket halves together.

While I have described a specific constructional embodiment of my invention, and have disclosed the resilient retainer as specifically applied to a plug socket, it is obvious that changes in the kind of connection used, and in the size, shape and material of the parts, may be made to suit different requirements and to adapt the novel resilient retainer for use in yieldingly resisting the separation of any two parts locked together therewith.

I claim:

1. In a connection socket plug, two members constituting a housing and having aligned recesses, plug clamps seated in said recesses, said members having transversely extending aligned bores with shoulders, a yielding retainer element seated in the bore of one member, and a lock element seated in the bore of the other member and secured to said retainer element, said elements having laterally extending portions contacting said shoulders.

2. In a connection socket plug, two members constituting a housing and having aligned recesses, plug clamps seated in said recesses, said members having transversely extending aligned bores with shoulders, a coil spring retainer element seated in the bore of one member, and a lock element seated in the bore of the other member and secured to said retainer element, said elements having laterally extending portions contacting said shoulders.

3. In a connection socket plug, two members constituting a housing and having aligned recesses, plug clamps seated in said recesses, said members having transversely extending aligned bores with shoulders, a coil spring retainer element seated in the bore of one member, and a coil spring lock element seated in the bore of the other member and secured to said retainer element, said elements having laterally extending portions contacting said shoulders.

WILLIAM P. HERMAN.